Figures 1, 2:
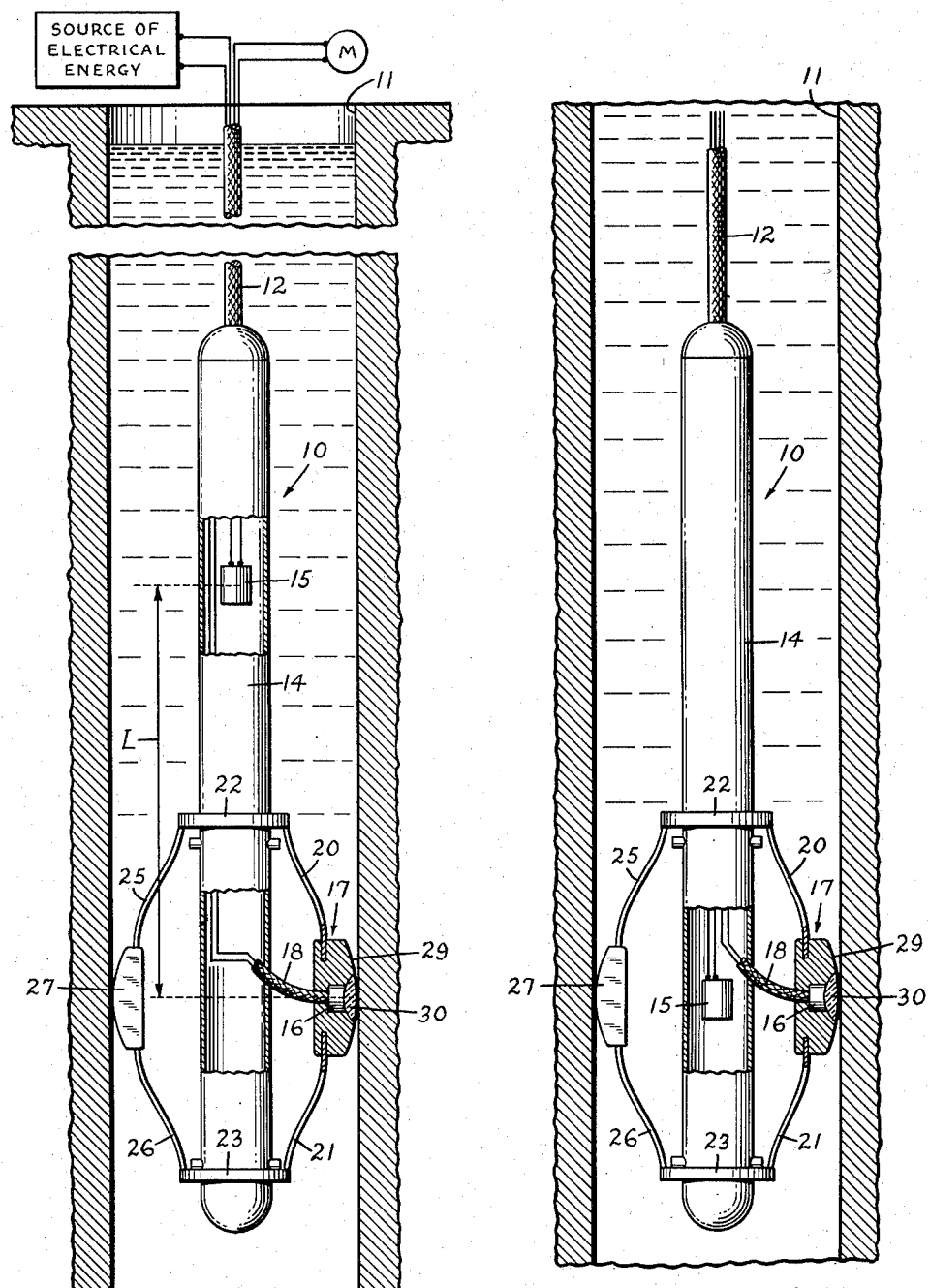

July 15, 1958           C. GOODMAN           2,843,752

NEUTRON-FLUORESCENCE WELL LOGGING METHOD AND APPARATUS

Filed May 4, 1953           2 Sheets-Sheet 1

INVENTOR.
CLARK GOODMAN
BY
HIS ATTORNEYS.

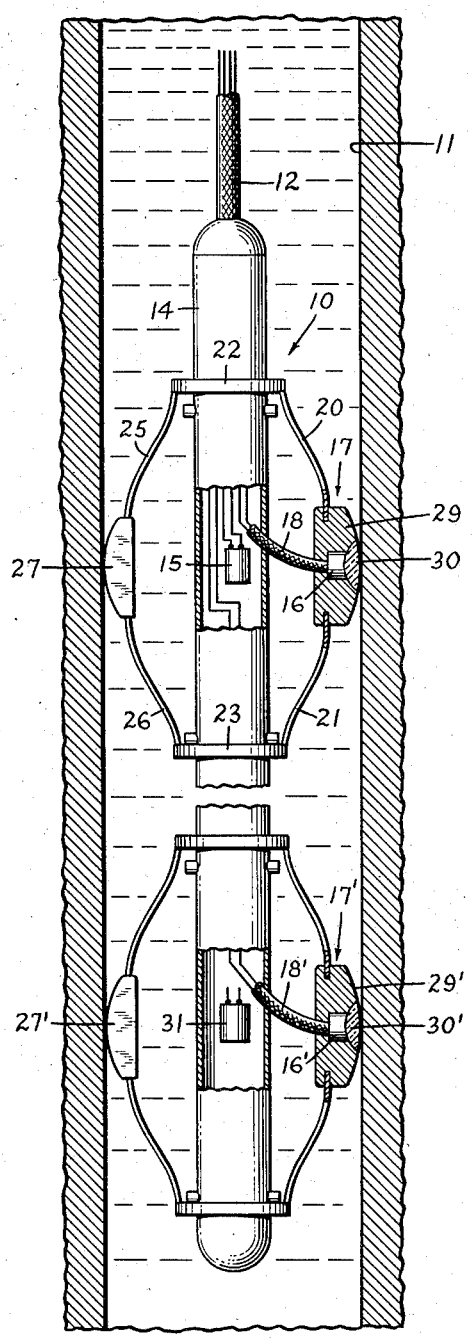

United States Patent Office 2,843,752
Patented July 15, 1958

2,843,752

NEUTRON-FLUORESCENCE WELL LOGGING METHOD AND APPARATUS

Clark Goodman, Boston, Mass., assignor, by mesne assignments, to Schlumberger Well Surveying Corporation, Houston, Tex., a corporation of Texas Application May 4, 1953, Serial No. 352,755

4 Claims. (Cl. 250—71)

The present invention relates to well logging and more particularly to methods and apparatuses for logging the fluorescence and/or the phosphorescence resulting from the neutron activation of the earth formations traversed by a bore hole.

In my copending application Serial No. 255,482, filed November 8, 1951, for "Method and Apparatus for Logging the Fluorescence and/or Phosphorescence of Earth Formations Traversed by a Borehole," there are disclosed methods and apparatuses for investigating materials by observing the fluorescence and/or phosphorescence induced therein by nuclear radiations such as beta particles and/or gamma rays, for example. The present application is addressed to analogous methods and apparatuses in which materials are investigated by activating them with neutrons and obtaining indications of the fluorescence and/or phosphorescence resulting therefrom.

It is an object of the invention to provide novel and useful well logging methods and apparatuses capable of locating valuable mineral deposits and distinguishing them from adjacent nonmineral bearing substances.

A further object of the invention is to provide novel methods and means whereby an emission of neutrons is produced inside a bore hole and indications are obtained of any fluorescence resulting therefrom.

Another object of the invention is to provide novel methods and apparatuses for logging the fluorescence and/or phosphorescence which is induced in earth formations traversed by a well when they are activated by neutrons.

In accordance with the invention, the earth formations traversed by a bore hole are irradiated with neutrons from a suitable source and indications are obtained by fluorescence responsive means disposed in fixed relation to the source of any fluorescence resulting from the irradiation of the formations.

The fluorescence observed may be that produced by fast neutron bombardment of fluorescent materials in the formations, or of the associated materials in the formations which transfer energy preferentially to the fluorescent materials, even though present in very low concentrations in the formations. Where the rate of decay of such fluorescence is very fast, i. e., its half-life is less than, say, one second, the fluorescence responsive means should be disposed very closely to the neutron source in order to detect it. On the other hand, if the fluorescence decays over an appreciable time, i. e., its half-life is greater than about one second, it is known as phosphorescence and it is preferably measured by disposing the fluorescence responsive means in fixed longitudinally spaced apart relation to the neutron source.

Alternatively, the fluorescence may be that which accompanies radioactive decay and results from beta and gamma radiation emitted by radioactive materials which have been induced in the formations by neutron bombardment thereof. Radioactivity may be induced in the formations by numerous types of nuclear reactions. For example $(n, \text{gamma})$, reactions can occur with neutrons at substantially all energy levels, but in general they are more probable, i. e., have a larger capture cross-section, with low energy or thermal neutrons. $(n, 2n)$ and $(n, n')$ reactions take place only with high energy neutrons. $(n, p)$ and $(n, \text{alpha})$ reactions take place in the medium weight and heavier elements with fast neutrons, and in the light elements with lower energy or thermal neutrons. The induced radioactivity resulting from any of these reactions may excite fluorescence in situ in materials in the surrounding formations. Where the rate of decay is relatively slow, i. e., the half-life is greater than about one second, fluorescence responsive means disposed in fixed longitudinally spaced apart relation to the neutron source should preferably be used to detect the fluorescence.

When neutrons pass through a fluid such as hydrogenous drilling mud contained within a bore hole, the energy level of the neutrons is reduced or moderated. Thus, when the neutron source is separated from the earth formations which are to be irradiated by the bore hole fluid, the bore hole fluid acts as a neutron moderator and slows many of the neutrons to thermal energies by the time they arrive at the bore hole wall.

If, upon irradiation of the formations with neutrons, phosphorescence and fluorescence having a half-life greater than about one second occur simultaneously, the elements involved may be distinguished, according to the invention, by simultaneously obtaining indications of the radioactive radiations (beta and/or gamma rays) from the induced radioactivity, and of the phosphorescence.

One important aspect of the invention is that it enables valuable mineral deposits, such as petroleum appearing in sediments surrounding the bore hole, or franklinite and zincite in ore deposits, to be located and specifically distinguished from the surrounding nonmineral-bearing horizons by means of the luminescence. For example, irradiation with high intensity neutrons will induce radioactivity in such elements as aluminum, sodium, potassium, iron, chlorine, and manganese which are commonly found in oil field sediments. Similarly, elements such as nickel, copper, zinc, strontium, antimony, barium, titanium, vanadium, and tungsten, which are commonly found in hard rock formations, may be excited in this manner. On the other hand, many crude oils found in the earth contain fluorescent substances. If this oil occurs in a sediment which contains a fairly high clay or shale content, radioactivity induced in the aluminum contained in the clay or shale would be sufficient to excite luminescence in the oil. Adjoining beds containing merely clay or shale without any oil would not be luminescent, though they would emit radioactive radiations.

If the drilling mud in the hole has fluorescent properties, permeable formations on which a mud cake has been formed could be readily located by irradiating the wall of the bore hole with neutrons and observing any fluorescence produced thereby.

As stated, for detecting fluorescence having a half-life less than about one second in the adjacent earth formations with the maximum intensity, the fluorescence responsive means should preferably be disposed in close proximity to the neutron source. On the other hand, where indications are to be obtained of phosphorescence or fluorescence of half-life greater than about one second in the formations, the fluorescence responsive means may be spaced apart from the neutron source, longitudinally with respect to the bore hole axis, by a distance substantially equivalent to the half-life of the radioactive decay, or of the phosphorescence, taking into account the logging speed in the bore hole.

For a better understanding of the invention, reference may be made to the following detailed description taken in conjunction with the drawings, in which:

Fig. 1 is a side view, partly in vertical section, of a logging array according to the invention disposed within a bore hole for detecting fluorescence of relatively long half-life in earth formations traversed by the bore hole;

Fig. 2 is a side view, partly in vertical section, of another embodiment of the invention for obtaining indications of fluorescence of relatively short half-life in earth formations traversed by a bore-hole; and Fig. 3 is a side view, partly in vertical section, of a further modification adapted to detect simultaneously fluorescence of both relatively long and relatively short half-life, in accordance with the invention.

Referring now to Fig. 1, there is disclosed a logging array 10 which is adapted to be lowered and raised through a bore hole 11 by an insulated electrical conducting cable 12 in conjunction with conventional winch means (not shown) at the surface. The logging array 10 may comprise a housing 14 containing a high intensity neutron source 15, which may be energized from a suitable source S at the surface through conductors in the conducting cable 12, and a photosensitive detecting means 16, which may be mounted on the housing 14 and spaced from the neutron source 15 by a distance L, extending longitudinally with respect to the bore hole axis. The distance L is a function of the half-life of the induced fluorescence and of the speed with which the logging array 10 passes through the bore hole. The source 15 may be of the type disclosed in my copending application Serial No. 275,932, filed March 11, 1952, for "Neutron Well Logging," which is adapted to provide a high intensity flux of monoenergetic neutrons in a well.

The photosensitive detecting means 16 may comprise one or more photosensitive devices mounted in a wall engaging carrier pad 17. The detecting means 16 may be electrically connected by conductors in an insulated conducting cable 18 to the interior of the housing 14, from which electrical signals representative of the detected luminescence or phosphorescence may be transmitted through conductors in the cable 12 to the surface of the earth where they may be measured by a suitable indicating instrument M.

During the movement of the logging array 10 through the bore hole 11, it is necessary to maintain the photosensitive detecting means 16 in close proximity to the wall of the bore hole 11. This may be accomplished, as is shown in Fig. 1, by supporting the pad 17 on leaf springs 20 and 21 attached to sliding collars 22 and 23, which, in turn, may be mounted on the outer surface of the housing 14. In order to maintain the housing 14 centered in the bore hole, supplementary leaf springs 25 and 26, and an associated back-up pad 27 may be fixed on the sliding collars 22 and 23, respectively, diametrically opposite the springs 20 and 21, respectively. If desired, a plurality of back-up pads could be spaced appropriately around the circumference of the housing 14.

The pad 17 may be formed with a narrow and sharp-edged surface 29 designed to cut through any mud cake that may exist on the bore hole wall, thereby allowing the detecting means 16 to "see" at all times any neutron activated fluorescent materials on the surface of the formations. Since the photosensitive device 16 is to be maintained in contact with the bore hole wall, or any mud cake thereon, a window 30 should be included in the surface of the pad 17. This window may be made of quartz or any other suitable abrasive-resistant material that is transparent.

Alternatively, the contacting surface 29 of the pad 17 may be made sufficiently broad to permit the pad to ride over any mud cake that may be encountered on the bore hole wall. Such an arrangement is valuable in locating permeable formations on which a mud cake has been formed, if the drilling mud has fluorescent properties. Fluorescent oil-base muds may be used or a fluorescent material may be purposely added to the drilling mud within the bore hole 11.

As aforementioned, the photosensitive device 16 may be spaced apart from the neutron source 15 by a longitudinal distance L, with respect to the bore hole axis. Desirably, this distance is made a function of the half-life of the induced fluorescence which it is desired to detect, and the speed with which the logging array 10 is moved through the bore hole 11. For example, if the half-life of the fluorescence or of the radioactive decay in a particular material is 3 sec. and the speed of the housing 14 is 3600 ft./hr., or in other words 1 ft./sec., the spacing L might be 3 ft.

In accordance with the invention, the apparatus described in Fig. 1 may be utilized to detect either phosphorescence or fluorescence having a half-life greater than about one second.

Where it is desired to detect fluorescence having a half-life less than about one second, the form of the invention shown in Fig. 2 may be employed. This apparatus is substantially the same as that in Fig. 1, with the exception that the photosensitive detecting means 16 is mounted directly opposite the neutron source 15 to enable the fluorescence to be detected with a maximum intensity.

If desired, the intensity of the induced fluorescence may be recorded at two or more longitudinally spaced apart points, relative to the source of neutrons, as shown in Fig. 3. This type of multiple detecting system may be useful in more accurately detecting the value of the induced fluorescence, or in determining the value of the half-life of the induced fluorescence. In Fig. 3, the logging array may include one photosensitive detecting means 16 in close proximity to the neutron source 15 and a second photosensitive detecting means 16' longitudinally spaced apart therefrom. The detecting means 16 is essentially the same as in Fig. 2 and like parts are designated by like reference characters. Corresponding parts of the second detecting means 16' are designated by corresponding primed reference characters.

Any suitable means may be employed to maintain the individual detecting device carrying pads and their associated springs and sliding collars at any desired spacing. For example, the photosensitive devices 16 and 16', shown in Fig. 3, may be spaced at an interval along the housing 14 that is a function of the half-life of the decay of the fluorescence to be detected and of the speed with which the logging array is moved through the bore hole. For a logging speed of 3,600 ft./hr. and a half-life of 3 sec. the spacing between the photosensitive devices 16 and 16' might be 3 feet.

Under the above conditions, the two detectors would be related by a factor of two with regard to the intensity of the induced fluorescence. The outputs of the detectors 16 and 16' may be recorded as a single track on a recorded log by taking the ratio of the two intensities electronically, or both intensities might be logged simultaneously and the ratio of the recorded logs could be determined after making the proper space correction.

It may be desirable to distinguish between the induced radioactivity and the induced fluorescence which may simultaneously occur in a combined form in portions of the earth formations. This may be readily achieved by simultaneously obtaining indications of the induced radioactivity along with the fluorescence, by means of a suitable radioactive radiation responsive device 31 provided with conventional indicating means (not shown) at the earth's surface, for example.

The invention thus provides novel and highly effective methods and means for discriminating between valuable mineral deposits traversed by a well and the adjacent nonmineral-bearing horizons. This is accomplished readily by irradiating the formations with neutrons and observing any fluorescence or phosphorescence produced thereby.

It will be understood that fluorescence measurements in a bore hole acccording to the invention may be made simultaneously with other logs in which a neutron source is used, i. e. $(n,\gamma)$, $(n,n)$ or $(n,$ induced radioactivity), with the appropriate detector either in the housing or pressed against the wall of the bore hole.

The above described embodiments are merely exemplary and are susceptible of modification and variation within the spirit and scope of the invention as defined in the appended claims. Any other neutron source may be employed including for example a conventional radium-beryllium neutron source employed in place of the sources described in my aforementioned application Serial No. 275,932. Further, when two or more photosensitive detecting devices are employed, as in the embodiment shown in Fig. 3, they may be enclosed in a single wall engaging carrier pad. Other modifications will be readily apparent to those skilled in the art.

I claim:

1. In apparatus for investigating earth formations traversed by a bore hole or the like containing a fluid, the combination of an elongated body adapted to be moved through the bore hole, a bore hole wall engaging member, means connecting said wall engaging member with said body for support thereby and for urging one surface of said wall engaging member against the bore hole wall, a source of neutrons mounted in said elongated body and disposed for irradiating through said bore hole fluid the earth formations adjacent said body to produce luminescence in the irradiated earth formations, the energy of said neutrons being moderated by said bore hole fluid, a window in said one surface of said wall engaging member adapted to be transparent to said luminescence, photoelectric means in said wall engaging member and disposed to receive said luminescence through said window from said irradiated earth formations, and means for exhibiting a function of the response of said photoelectric means to said luminescence as said body is moved through the bore hole.

2. Apparatus as described in claim 1, wherein said window is disposed in close proximity to said source of neutrons so that said photoelectric means receives fluorescent light from the irradiated earth formations.

3. Apparatus as described in claim 1, wherein said window is spaced a fixed distance from said source longitudinally of the bore hole so that said photoelectric means receives phosphorescent light from the irradiated earth formations.

4. Apparatus as described in claim 1, including a detecting means mounted in fixed relation to said source and responsive to radioactivity induced in said earth formations by irradiation by said neutrons.

References Cited in the file of this patent

UNITED STATES PATENTS

| | | |
|---|---|---|
| 2,220,509 | Brons | Nov. 5, 1940 |
| 2,288,717 | Kallmann et al. | July 7, 1942 |
| 2,303,688 | Fearon | Dec. 1, 1942 |
| 2,334,475 | Claudet | Nov. 16, 1943 |
| 2,512,020 | Herzog | June 20, 1950 |
| 2,648,012 | Scherbatskoy | Aug. 4, 1953 |
| 2,648,778 | Silverman et al. | Aug. 11, 1953 |